UNITED STATES PATENT OFFICE.

CHARLES J. JOHNSON, OF ST. LOUIS, MISSOURI.

PROCESS OF HARDENING METALS.

SPECIFICATION forming part of Letters Patent No. 685,842, dated November 5, 1901.

Application filed September 28, 1900. Serial No. 31,462. (No specimens.)

*To all whom it may concern:*

Be it known that I, CHARLES J. JOHNSON, a citizen of the United States, residing at the city of St. Louis, State of Missouri, have invented a new and useful Improvement in Processes of Hardening Metals, of which the following is a specification.

Heretofore to properly harden small articles made from steel after the same have been formed it has been necessary to treat such articles individually in a manner that requires experienced and expert workmen, and even under most favorable circumstances considerable loss is entailed due principally to unevenness in hardening.

I have discovered that by submerging the articles to be hardened (after they have been formed) at a temperature known as "cherry-red" in a solution or bath made of sal-soda, rosin, water, and animal oil (preferably made from lard or tallow) all difficulties are overcome and that each individual article is given its proper durability, strength, and elasticity.

In carrying out this process the articles of manufacture are formed by suitable machinery, which they leave at a white heat. I then cool them to a cherry-red heat by directing a current of air on them. The next step in the process is to submerge the said articles in a bath or solution made up as follows: sal-soda, one and one-half parts; rosin, one and one-half parts; animal oil, three parts, which is mixed in water. The relative proportions of the above ingredients may be varied slightly; but the figures given are approximately the ones used in practice. The articles leave this bath perfectly hardened and do not scale or become reduced in strength. They are given a proper color, are very smooth in appearance, and there is no loss of metal.

What I claim as new, and desire to secure by Letters Patent of the United States, is—

The herein-described process of hardening articles made of steel, which consists in first forming said articles under high heat, next reducing the temperature to a "cherry-red" by directing an air-current thereon, and then finally submerging said articles in a bath made of sal-soda, rosin, animal oil and water, substantially as described.

In testimony whereof I affix my signature in presence of two witnesses.

CHARLES J. JOHNSON.

Witnesses:
C. F. KELLER,
C. J. ANDERSON.